(12) United States Patent
Parker et al.

(10) Patent No.: US 11,661,908 B2
(45) Date of Patent: May 30, 2023

(54) AIRBREATHING ENGINE MODULE WITH REVERSE FLOW ARRANGEMENT

(71) Applicant: Reaction Engines Limited, Abingdon (GB)

(72) Inventors: Richard John Parker, Abingdon (GB); Richard Anthony Varvill, Abingdon (GB)

(73) Assignee: Reaction Engines Limited, Abingdon (GB)

( * ) Notice: Subject to any disclaimer, the term of this patent is extended or adjusted under 35 U.S.C. 154(b) by 0 days.

(21) Appl. No.: 17/274,730

(22) PCT Filed: Aug. 16, 2019

(86) PCT No.: PCT/EP2019/072062
§ 371 (c)(1),
(2) Date: Mar. 9, 2021

(87) PCT Pub. No.: WO2020/052910
PCT Pub. Date: Mar. 19, 2020

(65) Prior Publication Data
US 2021/0310442 A1   Oct. 7, 2021

(30) Foreign Application Priority Data
Sep. 12, 2018   (GB) ..................... 1814837

(51) Int. Cl.
*F02K 9/78* (2006.01)
*F02K 3/02* (2006.01)
(Continued)

(52) U.S. Cl.
CPC ............... *F02K 9/78* (2013.01); *F02C 7/143* (2013.01); *F02K 3/02* (2013.01); *F02K 7/18* (2013.01); *F02K 9/425* (2013.01); *F05D 2220/10* (2013.01)

(58) Field of Classification Search
CPC .... F02K 9/78; F02K 7/18; F02C 3/145; F02C 7/143; F02C 7/185; F23R 3/54; B64G 1/402
See application file for complete search history.

(56) References Cited

U.S. PATENT DOCUMENTS 2,673,445 A    3/1954  Bruckmann
4,722,357 A *  2/1988  Wynosky .................. F02C 7/04
                                                137/15.1
(Continued)

FOREIGN PATENT DOCUMENTS

EP    1 820 955 A2    8/2007
GB    2 519 150 A     4/2015
(Continued)

OTHER PUBLICATIONS

PCT/EP2019/072062, Oct. 10, 2019, International Search Report and Written Opinion.
(Continued)

*Primary Examiner* — Todd E Manahan
*Assistant Examiner* — Kyle Robert Thomas
(74) *Attorney, Agent, or Firm* — Wolf, Greenfield & Sacks, P.C.

(57) ABSTRACT

A hybrid airbreathing rocket engine module (70) comprises an air intake arrangement (62) configured to receive air and a heat exchanger arrangement (63) configured to cool air from the air intake arrangement (62); a compressor (64) configured to compress air from the heat exchanger arrangement (63); and one or more thrust chambers (65). The air intake arrangement (62), the compressor (64), the heat exchanger arrangement (63), and the one or more thrust chambers (65) are arranged generally along an axis (69) of
(Continued)

the engine module (70). The heat exchanger arrangement (63) is arranged between the compressor (64) and the one or more thrust chambers (65).

20 Claims, 6 Drawing Sheets

(51) Int. Cl.
*F02K 9/42* (2006.01)
*F02K 7/18* (2006.01)
*F02C 7/143* (2006.01)

(56) References Cited

U.S. PATENT DOCUMENTS

| | | | | |
|---|---|---|---|---|
| 5,058,617 | A * | 10/1991 | Stockman | B64D 33/02 137/15.1 |
| 5,191,761 | A * | 3/1993 | Janeke | B64G 1/14 60/768 |
| 5,224,344 | A | 7/1993 | Keirsey et al. | |
| 7,165,744 | B2 * | 1/2007 | Howarth | B64D 33/04 244/55 |
| 8,215,589 | B2 * | 7/2012 | Janeke | B64G 1/62 244/158.9 |
| 2011/0056208 | A1 | 3/2011 | Norris et al. | |
| 2012/0110978 | A1 | 5/2012 | Paul | |
| 2015/0128597 | A1 * | 5/2015 | Schlak | B60K 5/08 60/719 |
| 2015/0251766 | A1 * | 9/2015 | Atkey | B64D 13/06 60/785 |
| 2015/0330869 | A1 * | 11/2015 | Ziarno | G01M 15/14 701/34.4 |
| 2016/0076461 | A1 * | 3/2016 | Kawai | B64D 37/30 60/39.463 |
| 2018/0094647 | A1 * | 4/2018 | Puzik | F04D 29/4206 |

FOREIGN PATENT DOCUMENTS

| | | |
|---|---|---|
| GB | 2 519 153 A | 4/2015 |
| KR | 10-2011-0072801 A | 6/2011 |
| RU | 1734442 C | 1/1995 |

OTHER PUBLICATIONS

GB1814837.9, Feb. 26, 2019, Search Report.
International Search Report and Written Opinion for International Application No. PCT/EP2019/072062, dated Oct. 10, 2019.
Search Report for British Application No. 1814837.9, dated Feb. 26, 2019.
Maloney, Air Victory Museum—German WWII Junkers Jumo 004 Turbojet. www.williammaloney.com/Aviation/AirVictoryMuseum/JunkersJumo004Turbojet/index.htm#14. Jul. 4, 2008:1-2.
Sato et al., IAF-97-S.5.01 Development Study on Atrex Engine System. International Astronautical Federation. 1997:1-11.
Varvill et al., A comparison of propulsion concepts for SSTO reusable launchers. Journal of the British Interplanetary Society. Mar. 1, 2003;56(3/4):108-17.
GB1814837.9, Apr. 25, 2022, Search Report.
Search Report for British Application No. 1814837.9, dated Apr. 25, 2022.
EP19756165.7, Sep. 30, 2022, Communication Pursuant to Article 94(3) EPC.
Office Action for Russian Application No. 2021103092/11(006721), dated Dec. 2, 2022.
2021103092/11(006721), Dec. 2, 2022, Office Action.
Communication Pursuant to Article 94(3) EPC for European Application No. 19756165.7, dated Sep. 30, 2022.

\* cited by examiner

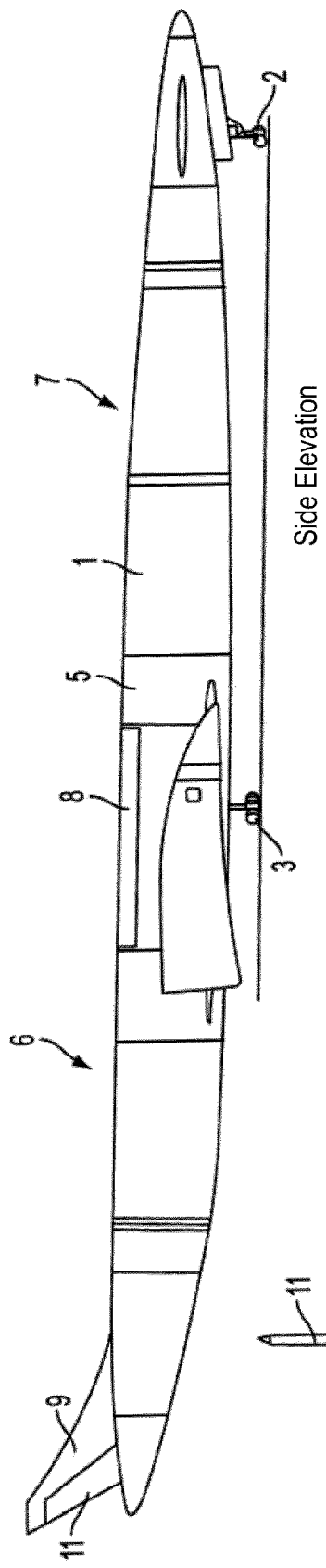
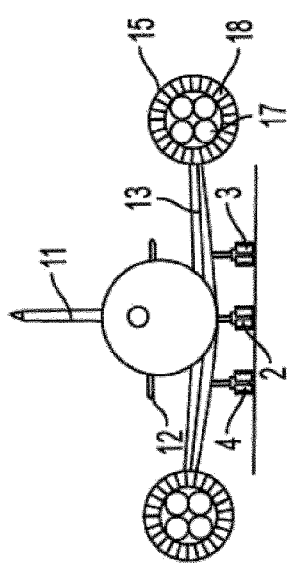
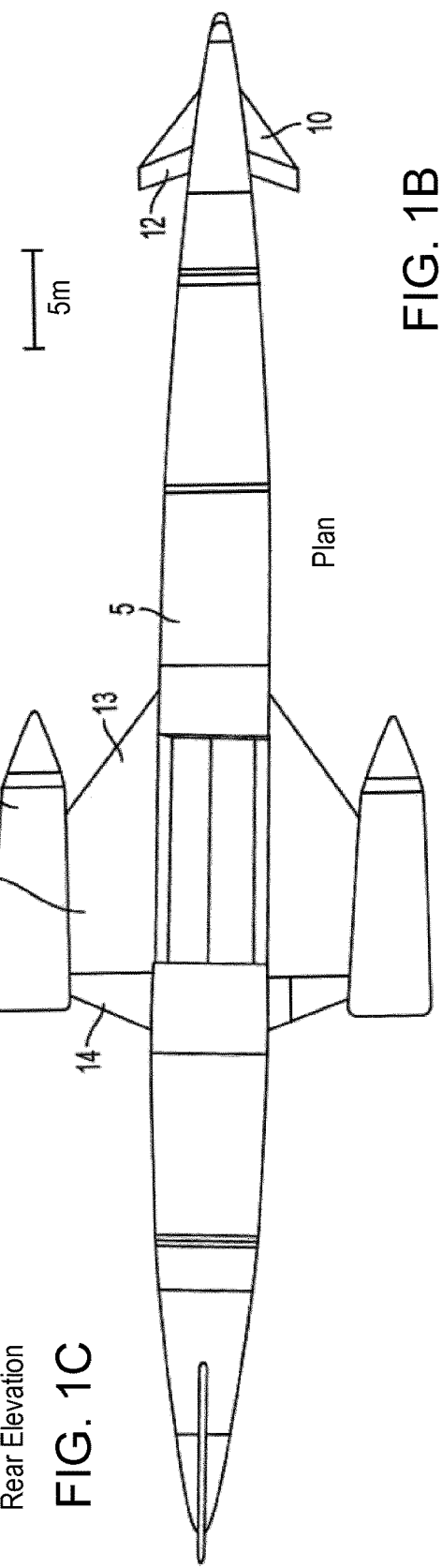
FIG. 1A Side Elevation
FIG. 1B Plan
FIG. 1C Rear Elevation

AIRBREATHING ENGINE MODULE WITH REVERSE FLOW ARRANGEMENT

RELATED APPLICATIONS

This Application is a national stage filing under 35 U.S.C. § 371 of International Patent Application Serial No. PCT/EP2019/072062, filed Aug. 16, 2019, which claims priority to British application number 1814837.9, filed Sep. 12, 2018, each of which is incorporated by reference herein in its entirety.

FIELD

The present disclosure relates to an engine module such as of the type which may be used in aerospace applications. The disclosure also relates to a structure for an engine module of a rocket engine as well as an aircraft, flying machine or aerospace vehicle including such an engine module or structure.

BACKGROUND

GB2519155 describes a hybrid aerospace propulsion engine for a single stage to orbit (SSTO) vehicle. Such an engine comprises a rocket combustion chamber, an air breathing combustion chamber and a compressor for pressurizing air for supply to the air breathing combustion chamber. Such an engine can operate using compressed air as an oxidant and a fuel for combustion in the air-breathing combustion chambers. This can reduce the fuel requirements compared with an engine with only a rocket combustion chamber alleviating the fuel carrying requirements of an aircraft with such an engine.

The present disclosure seeks to alleviate, at least to a certain degree, the problems and/or address at least to a certain extent, the difficulties associated with the prior art.

SUMMARY

According to a first aspect of the disclosure, there is provided a hybrid airbreathing rocket engine module comprising:
an air intake arrangement configured to receive air;
a heat exchanger arrangement configured to cool air from said air intake arrangement;
a compressor configured to compress air from said heat exchanger arrangement; and
one or more thrust chambers;
wherein the air intake arrangement, the compressor, the heat exchanger arrangement, and the one or more thrust chambers are arranged generally along an axis of the engine module; and
wherein the heat exchanger arrangement is arranged between the compressor and the one or more thrust chambers.

When arranged along the axis, e.g. the longitudinal axis, of the engine module, one or more of the respective axes of the air intake arrangement, the compressor, the heat exchanger arrangement, and the one or more thrust chambers may be aligned with the axis or may be arranged parallel to and/or spaced apart from the axis of the engine module.

The air intake arrangement may comprise an inlet cone configured to decelerate air received by the air intake arrangement.

The compressor may be at least partially arranged inside the inlet cone. Such an engine module may advantageously have a reduced length compared with prior art engine modules, thus allowing for a more compact and lightweight engine.

The compressor may have an inlet end and an outlet end, and the inlet end of the compressor may be arranged facing the heat exchanger arrangement. Such an engine module may advantageously provide a much more uniform (i.e. constant) pressure drop between the inner and outer radial surfaces of each of the heat exchanger sections of the heat exchanger arrangement, across the length of the heat exchanger arrangement, compared with the prior art engine module. This correlates to a much more uniform mass flow distribution through each heat exchanger section and advantageously reduces or negates the need for a mechanical flow-balancing solution, for example flow control measures such as turning vanes. This advantageously leads to a further reduction in the overall mass of the engine module.

Optionally, the engine module provides a first air flow path from the air intake arrangement to the heat exchanger, and a second air flow path from the heat exchanger to the inlet end of the compressor, wherein the second air flow path is configured to allow air to flow in a substantially longitudinal direction which is opposite to the flow of air in the first air flow path.

Optionally, the engine module may provide a third air flow path from the outlet end of the compressor to the one or more thrust chambers, wherein the third air flow path is configured to allow air to flow in a substantially longitudinal direction which is opposite to the flow of air in the second air flow path.

The engine may further comprise a nacelle, wherein the inlet cone, the heat exchanger arrangement, the compressor and the one or more thrust chambers are each at least partially arranged within the nacelle.

Optionally, the inlet cone may be axisymmetric.

Optionally, the axis of the engine module may be curved.

Optionally, the engine may further comprise a fuel tank, wherein the fuel tank is arranged between the heat exchanger arrangement and the one or more thrust chambers.

The one or more thrust chambers may each comprise at least one rocket nozzle.

Optionally, the hybrid airbreathing rocket engine module is configured to be switchable from an airbreathing mode to a full rocket mode. The nozzles may operate in an air breathing mode using compressed air from the compressor and a fuel. In a rocket mode, the nozzles may operate using liquid oxygen and fuel.

According to a second aspect of the disclosure, there is provided a structure for an engine module of a rocket engine, said structure comprising an inlet cone defining a volume for receiving an engine component. The engine component may be a compressor.

According to a third aspect of the disclosure, there is provided an aircraft, flying machine or aerospace vehicle comprising an engine module according to the first aspect of the invention with or without any optional feature thereof.

BRIEF DESCRIPTION OF THE DRAWINGS

The present invention may be carried out in various ways and embodiments of the invention will now be described by way of example with reference to the accompanying drawings, in which:

FIGS. 1A, 1B and 1C show side, plan and rear elevations respectively of a prior art single stage to orbit (SSTO) aircraft;

DETAILED DESCRIPTION

Figure 2:
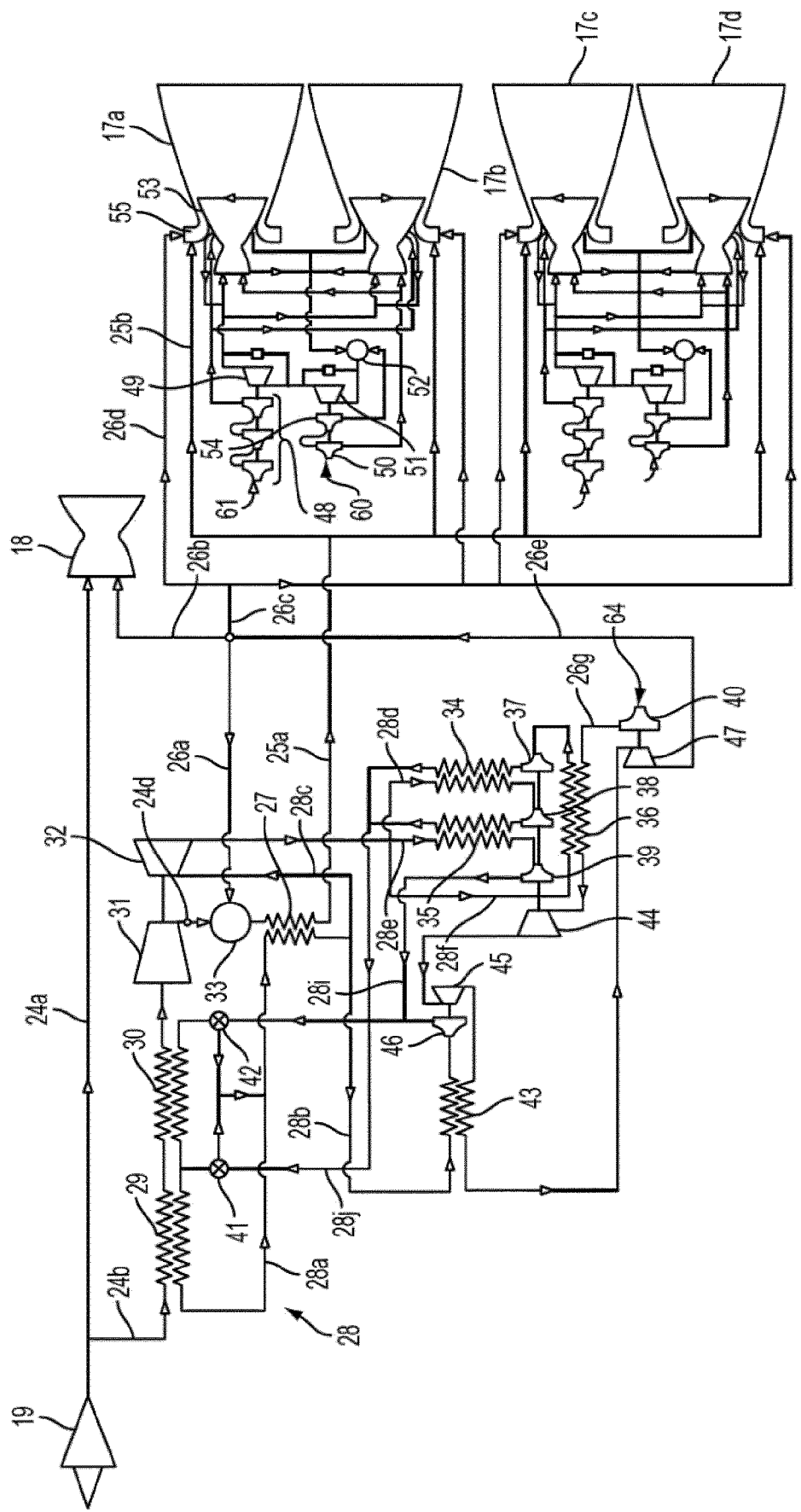
FIG. 2 shows a schematic cycle diagram of a prior art hybrid airbreathing rocket engine.

FIGS. 1A, 1B and 1C show a single stage to orbit (SSTO) aircraft 1 with a retractable undercarriage 2, 3, 4 having a fuselage 5 with fuel and oxidant stores 6, 7 and a payload region 8. A tail fin arrangement 9 and canard arrangement 10 with respective rudder 11 and canard 12 control surfaces are attached to the fuselage 5. Main wings 13 with elevons 14 are attached to either side of the fuselage 5 and each wing 13 has an engine module 15 attached to a wing tip 16 thereof. As shown in FIGS. 1C and 2, the rear of each engine module 15 is provided with four rocket nozzles 17 surrounded by various bypass burners 18.

FIG. 2 shows a schematic cycle diagram of a prior art hybrid airbreathing rocket engine as known from GB2519155. As an example of its application, such an engine may be incorporated into the engine module of the present disclosure. However, the invention is not limited to this specific engine arrangement. The basic elements and operation of such an engine will now be described in order to assist in the understanding of the present invention.

The engine comprises an air intake 19. The air intake 19 may be axisymmetric such that when the aircraft is travelling at supersonic velocities, the air-intake 19 serves to decelerate the captured airflow to subsonic via oblique and normal shock waves. At high Mach numbers, e.g. around Mach 5 and above, this deceleration can cause the air inlet temperature typically to increase to over 1250K.

The air passing through the air intake splits into two flow paths. One of these flow paths 24a supplies air to a bypass burner 18 comprising a nozzle. More hydrogen than needed is supplied to the cycle and the bypass burners can be used in combination with the main combustion chambers to improve fuel utilization and engine performance. Another portion of the air from the air intake 19 passes via flow path 24b to a first heat exchanger arrangement configured as a pre-cooler, which is needed to cool the compressed inlet air. In the prior art embodiment, the pre-cooler comprises a first heat exchanger stage 29 and a second heat exchanger stage 30 although a pre-cooler with any number of heat exchanger stages can be envisaged. The first stage 29 of the heat exchanger and the second stage of the exchanger 30 correspond to higher and relatively lower temperature portions respectively.

Following the passage of the air through the heat exchanger stages 29, 30, the air passes through compressor 31 which is driven by turbine 32 as described in further detail below. The compressor is chosen to provide a predetermined compression ratio dependent on the performance requirements of the engine. In the prior art embodiment, the compressor may typically have a compression ratio of around 13:1 such that the intake air is compressed to around 16 bar. The compressor may comprise two spools and may comprise titanium blades.

Typically, such an engine will be provided with a plurality of combustion chambers and associated rocket nozzles. In the schematic, four nozzles 17a, 17b, 17c, 17c are shown, though any number of nozzles may be envisaged. Sharing each nozzle are two combustion chamber types. One combustion chamber type is used in an airbreathing mode of operation for the combustion of fuel, such as hydrogen with pressurized air which has come from the compressor 31. The air may be used to partially combust a portion of the hydrogen in a pre-burner 33, before being delivered to the airbreathing combustion chambers. The other combustion chamber type is used in full rocket mode, i.e. when on-board oxidant, such as liquid oxygen, is utilized instead of the compressed air.

Although only one nozzle and associated combustion chambers of the above described types will be highlighted when describing the operation of the prior art engine, it should be understood that any other rocket chambers/nozzles provided may operate in a similar or identical manner and that each will receive a proportion of the fuel and oxidant in order to operate and provide thrust to the vehicle.

A typical aircraft or vehicle may include four combustion chamber/nozzle assemblies arranged in a nacelle. However, any number of chamber/nozzle assemblies may be provided in order to provide the required thrust to the vehicle.

In an aircraft with two nacelles, each comprising four nozzle assemblies, the nozzle assemblies can be configured to behave as a single engine during air breathing ascent and as two twin chamber rocket engines during rocket ascent. This can serve to increase mission reliability and minimize the volume of the engine installation.

Compressed air from the outlet of the compressor 31 is fed to a pre-burner 33 via flow path 24d. The pre-burner 33 may also be supplied with fuel, in the embodiment in the form of hydrogen, via flow path 26a. The hydrogen may be stored on-board the aircraft, typically in cryogenic form and delivered, in the embodiment by pump or compressor 40 from store 64.

Downstream of the pre-burner 33, a heat exchanger 27 is provided to transfer heat from the pre-burner combustion products to a closed loop helium cooling circuit 28.

The helium cooling circuit 28 may, in some modes of operation, pass through the first and second stages 29, 30 of the pre-cooler. The pre-cooler operates as a counter-flow heat exchanger. In such a mode, following the first stage 29 of the pre-cooler, i.e. the stage downstream in the helium loop of the second stage, the helium stream passes along path 28a to the pre-burner combustion heat exchanger 27.

Following the pre-burner combustion heat exchanger 27, the helium loop splits into first and second helium streams 28b and 28c. The second helium stream 28c passes through turbine 32, in the embodiment with an inlet pressure of around 200 bar and outlet pressure of around 60 bar. The turbine 32 is used to drive the compressor 31. The turbine 32 may be a counter-rotating turbine.

Following its exit from the turbine 32, the helium stream, in the embodiment at around 600 degrees Kelvin (600K), passes to a heat exchanger and recompression stage, which in the embodiment, comprises three helium regenerator heat exchangers, 34, 35, 36 and recirculators, e.g. compressors or pumps 37, 38, 39.

The regenerator heat exchangers 34, 35, 36 may comprise thousands of diffusion bonded thin titanium sheets with micro-channels formed into their surface. The compressors or recirculators 27, 38, 39 may comprise centrifugal turbomachinery.

The helium stream from the turbine 32 splits into first, second and third recompression helium streams 28d, 28e, 28f.

The first recompression helium stream 28d, in the embodiment at around 600K passes through the first regenerator heat exchanger 34 where it is cooled to around 100K. The helium is then recompressed in compressor 38, in the embodiment from around 60 to around 200 bar, before then passing through second regenerator heat exchanger 35, which serves to cool the second recompression helium stream 28e from the turbine 32, in the embodiment from around 600K to around 200K. The first recompression helium stream then joins helium stream 28j.

After the second regenerator heat exchanger 35, the second recompression helium stream 28e is recompressed in third compressor 39, in the embodiment from around 60 bar to 200 bar, before passing to helium stream 28i. The helium stream 28i then joins the helium stream from the pre-burner heat exchanger 27, before joining first diverter valve 41, which here can be used to divert the helium stream from the second stage 30 of the pre-cooler.

The third recompression helium stream 28f passes to third regenerator heat exchanger 36, where it is cooled by hydrogen stream 26g, in the embodiment from around 600 to 50K. The hydrogen stream is provided with a fuel delivery arrangement, here in the form of liquid hydrogen pump 40, which delivers hydrogen from an onboard hydrogen store 64.

After the heat exchanger 36, the third recompression helium stream passes through first compressor 37, where in the embodiment, the helium is compressed from around 60 to around 200 bar. The helium stream then passes through heat exchanger 34, serving to cool the first recompression helium stream 28d as described above, before then joining helium stream 28j with the first recompression helium stream 28d which has passed through heat exchanger 35.

Helium stream 28j passes to first diverter valve 41, which can be used to supply additional cooled helium to a predetermined stage of the pre-cooler, here before the first stage 29 of the pre-cooler.

The helium stream from the pre-burner heat exchanger 27 is cooled, in the embodiment from around 900 to around 300K in heat exchanger 43, by hydrogen which has passed through the third regenerator heat exchanger 36. Before reaching the heat exchanger 43, the hydrogen passes through turbine 44, which is used to drive the first, second and third compressors 36, 37, 38 of the recompression stage. The hydrogen also passes through turbine 45 to drive helium pump 46 to pump helium to the second diverter valve 42.

Following heat exchanger 43, the hydrogen passes through turbine 47, which drives the hydrogen pump 40, which serves to pump hydrogen from the on-board hydrogen store 64.

Following turbine 47, hydrogen passes to bypass burner 18 as well as pre-burner 33 and then during airbreathing operation, to the airbreathing combustion chambers of the rocket nozzles 17a, 17b, 17c.

In the known engine, the combustion chambers may be lined using liners comprising, for example, an alumina dispersion hardened copper such as GLIDCOP AL-20 or other suitable thermally conducting material. Such thermally conductive material may be employed in view of the high wall temperature that can be reached in the combustion chambers during the air breathing operating mode. This avoids thermal stress in the wall. In this mode of operation, the combustion chamber may be film-cooled using hydrogen through film cooling in the combustion chambers.

In the known engine, the nozzles 17a, 17b, 17c, 17d comprise a tubular cooled skirt with a final radiation cooled extension, for example of SEP-CARBINOX. This seeks to enable the nozzles to survive external air flow heating during re-entry into the atmosphere, when no coolant is available for engine cooling. In the embodiment, the cooled tubular skirt is made from high temperature alloys, such as Inconel, which may comprise a plurality of tubes.

In the prior art engine, during air breathing mode, liquid hydrogen may be configured to cool the nozzle skirt by passing hydrogen through the tubes in the skirt. In rocket mode, hydrogen may pass through the liner of the separate rocket combustion chambers 53 and the tubular skirt before entering an injector (not illustrated) of the rocket combustion chamber.

The pre-cooler 29, 30 is used to cool the inlet air in airbreathing mode. In the embodiment, the pre-cooler 29, 30 is a high performance heat exchanger which uses high pressure gaseous helium in a closed loop as a cooling medium. The helium loop in airbreathing mode is described in further detail below.

A suitable pre-cooler heat exchanger may be configured as a counter flow heat exchanger with a matrix of cooling channels or tubes of less than 1 mm in diameter with thin walls of typically 20-30 micrometers. A large number e.g. 300,000 to 600,000 of such tubes are nested and arranged in involute spirals in each heat exchanger in order to provide the necessary performance. The tubes may follow a spiral path from the inlet to the outlet with the tubes extending either radially or axially. In the prior art embodiment, the pre-cooler is configured to enable cooling of the inlet air from temperatures of 1250K to a temperature of about 400K or less depending on the mode of operation. In the prior art embodiment, at all velocities, the temperature of the air is maintained above the freezing point of water, i.e. 0 degrees Centigrade.

As outlined above, hydrogen is supplied from store 64 by pump 40 where it is used to cool the helium circuit via heat exchangers 36 and 43. Boost pumps (not illustrated) may be provided to prevent cavitation of the fuel pump 40 and minimize residual fluid trapped in feed lines.

Following hydrogen turbine 47, hydrogen is fed to the pre-burner 33 along flow path 26a. Hydrogen may also be fed to the by-pass burners 18 via flow paths 26b, 26e. Additionally, in airbreathing mode, hydrogen may be supplied to the rocket combustion chambers along flow paths 26c and 26d, where it is combusted with the pre-burner combustion products delivered along flow paths 25a and 25b. In airbreathing mode, the airbreathing combustion chambers operate at around 12 bar. This airbreathing combustion chamber is separate to the rocket combustion chambers used in full rocket mode, which operate at a relatively much higher pressure of around 170 bar.

For rocket mode, each rocket nozzle and combustion chamber arrangement is supplied with hydrogen using a fuel delivery system, which in the embodiment comprises an on-board hydrogen store 61 and a series of pumps 48 achieving a pressure of around 315 bar. In the embodiment, the hydrogen is initially delivered to provide cooling of the rocket combustion chambers 53.

After being used to cool the combustion chambers 53, hydrogen is supplied to a combustion chamber pre-burner 52, where it is partially combusted with oxygen supplied by an oxidant delivery system, in the embodiment comprising liquid oxygen pump 50 and topping up pump 54.

The combustion products of the rocket pre-burner 52 serve to drive turbines 49, 51 which drive the oxygen and hydrogen pumps 48, 50, 54.

The combustion products of the pre-burner 52 are then fully combusted in the combustion chamber 53 with additional oxygen supplied by oxygen pump 50.

In the airbreathing mode of operation of the prior art engine, liquid oxygen is not needed as an oxidant for the rocket chamber. Airbreathing enables an aircraft which comprises such an engine to take off without needing to use a separate source of oxygen and without an additional propulsion means, which has significant weight advantages as there is a reduced requirement to carry an additional oxidant on the aircraft.

The pre-burner 33 exhaust is used to pre-heat the helium via heat exchanger 27, in the embodiment to around 930K and pressure of 200 bar, before the helium passes to turbine 32 to drive the air intake compressor 31. The pre-burner 33 is controlled, e.g. the amount of hydrogen combusted is controlled, to maintain a constant upper cycle temperature of helium, in the embodiment typically around 930K, which is independent of the Mach number of the aircraft while in airbreathing mode.

The pre-burner 33 burns hydrogen from the on-board store 64 with compressed air fed along flow path 24*d*. The pre-burner outlet gases flow along path 25*a* before being fed into the air breathing combustion chamber 55.

Although the pre-burner 33 may be chosen depending on the performance requirements of the prior art engine, in the prior art embodiment, the pre-burner 33 and heat exchanger 27 form an integral unit comprised of a hydrogen rich combustor and shell-and-tube heat exchanger with a single floating tube sheet.

Figure 3:
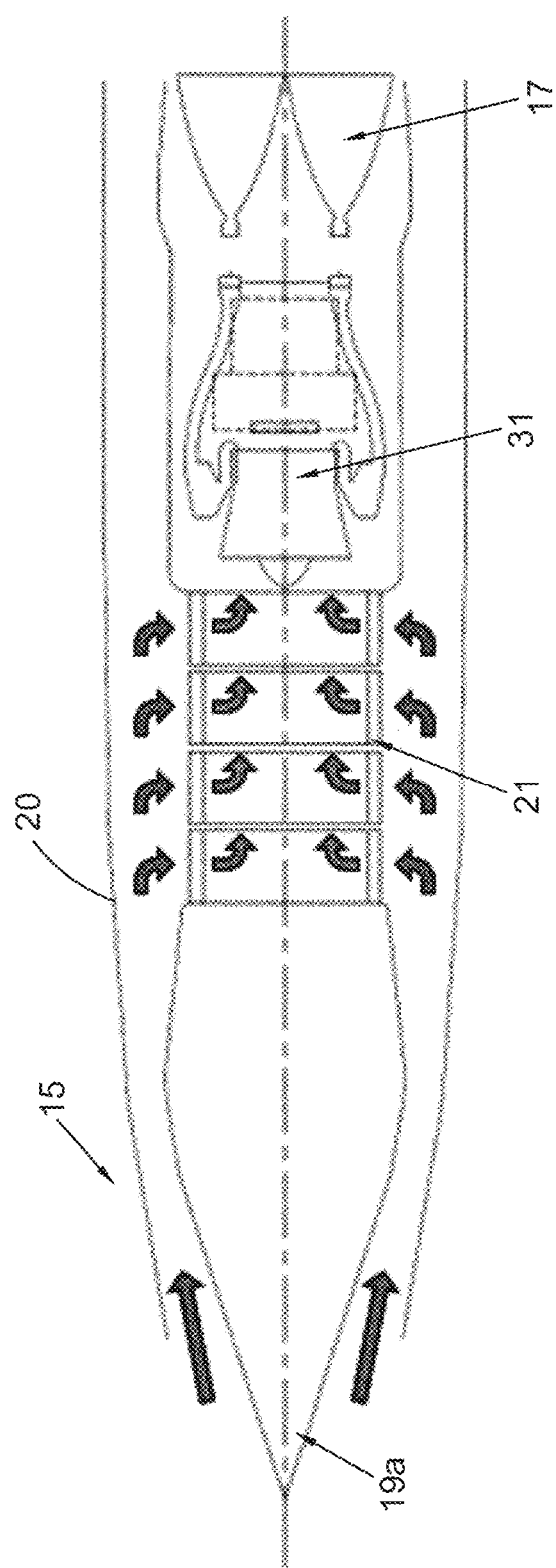
FIG. 3 shows a schematic diagram of a cross-section through a prior art hybrid airbreathing rocket engine module.

FIG. 3 shows a schematic diagram of a cross-section through a prior art hybrid airbreathing rocket engine module 15, which may incorporate the engine as described above in relation to FIG. 2. The prior art hybrid airbreathing rocket engine module 15 includes an air intake arrangement 19*a*, a heat exchanger arrangement in the form of a pre-cooler 21 comprising four heat exchanger sections 63*a*, 63*b*, 63*c* and 63*d*, and a compressor 31, all arranged generally along a longitudinal axis of the engine and contained within a nacelle 29 which may be attached to an aircraft wing 13, such as an aircraft wing 13 of an aircraft 1 as shown in FIGS. 1A, 1B and 10.

The prior art hybrid airbreathing rocket engine module 15 can operate on the cycle shown in FIG. 2 and as described above, such that the air intake arrangement 19*a* is configured to receive air, a portion of which then flows into the pre-cooler 21. The pre-cooler 21 cools the inlet air. Following the flow of the air through the pre-cooler 21, the air then flows through the compressor 31, before flowing to one or more thrust chambers 17 which are in the form of airbreathing combustion chambers.

The hybrid airbreathing rocket engine module of the present disclosure may comprise an engine which is configured to be switchable from an airbreathing mode to a full rocket mode. This may be achieved by employment of, for example, an engine with the arrangement and cycle of FIG. 2. As such, it should be understood that the hybrid airbreathing rocket engine module of the present disclosure can operate in a similar or identical manner to the prior art hybrid airbreathing rocket engine module described and shown in FIGS. 2 and 3, and that the components described herein may be structurally and/or functionally similar or identical to those described above in relation to the prior art hybrid airbreathing rocket engine module. The structural layout of the hybrid airbreathing rocket engine module of the present disclosure shall now be described, with reference to FIG. 4.

Figure 4:
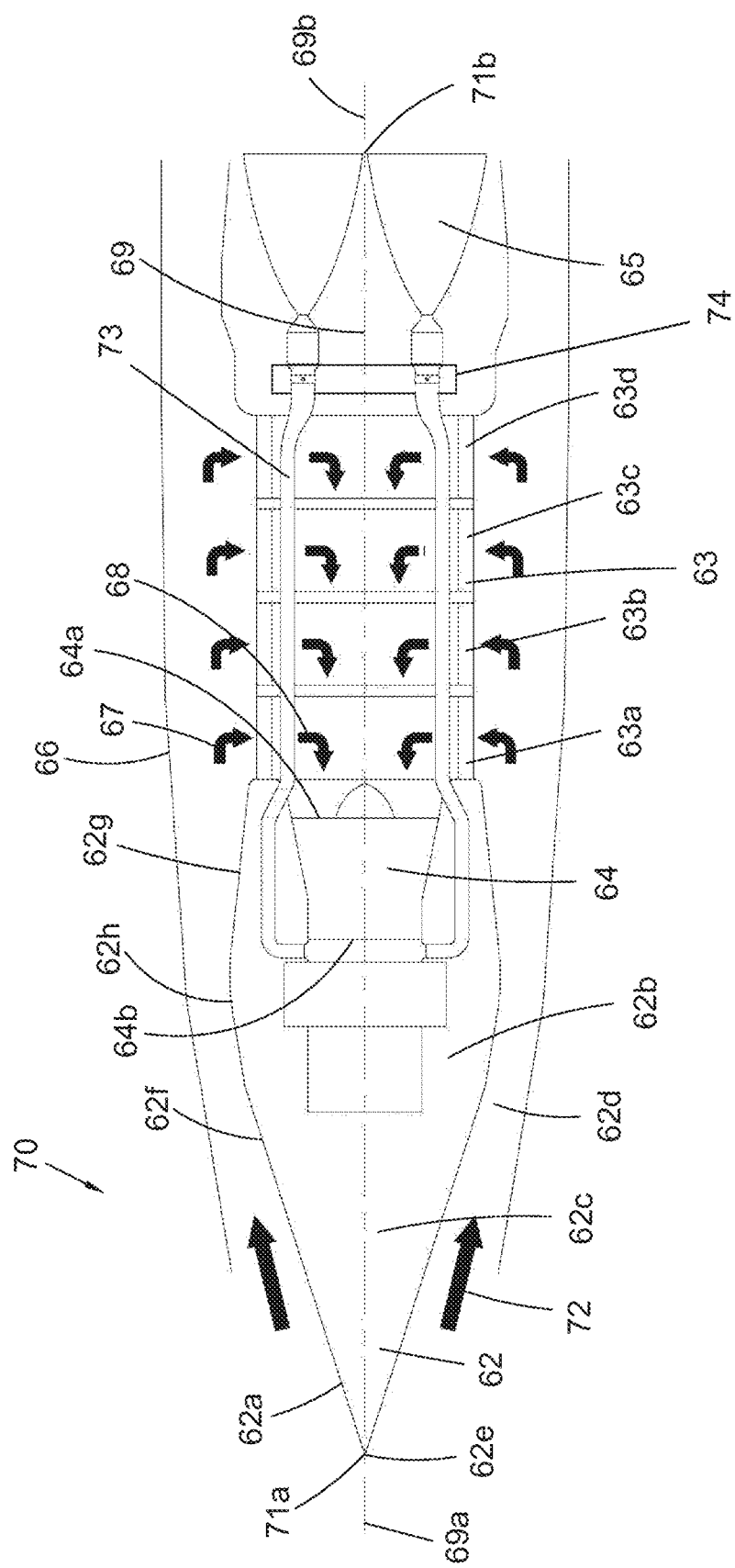
FIG. 4 shows a schematic diagram of a cross-section through a hybrid airbreathing rocket engine module.
Figure 6:
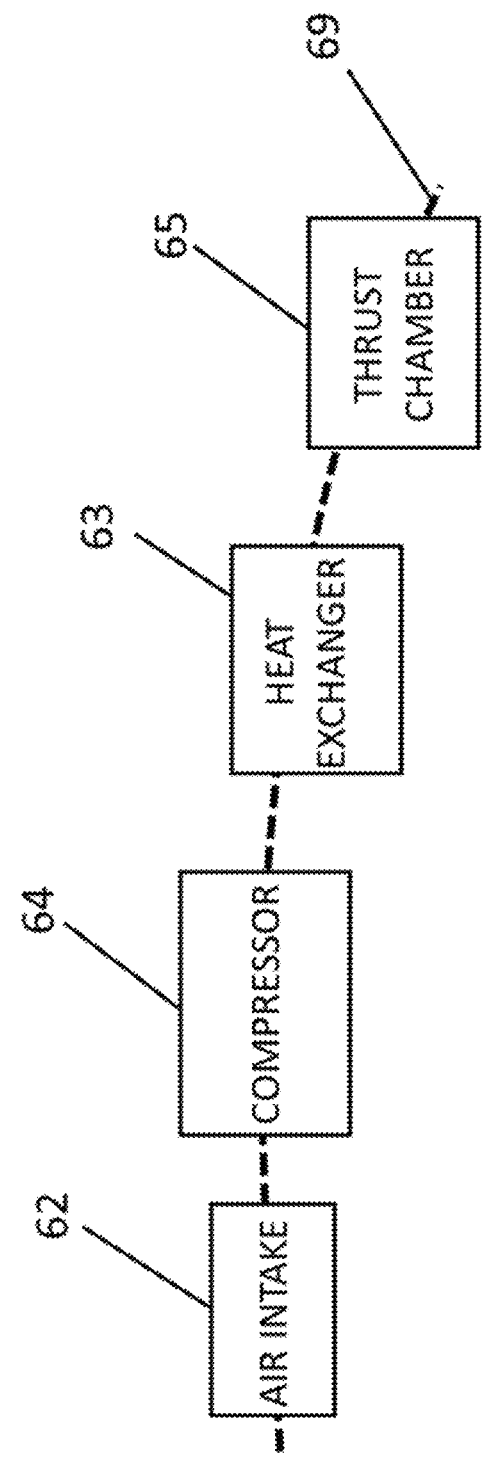
FIG. 6 shows a schematic diagram of an engine module having an air intake arrangement, heat exchanger arrangement, compressor and one or more thrust chambers arranged on a curved longitudinal axis.

FIG. 4 shows a schematic diagram of a cross-section through a hybrid airbreathing rocket engine module 70. The hybrid airbreathing rocket engine module 70 includes an air intake arrangement 62, a heat exchanger arrangement in the form of a pre-cooler 63, a compressor 64, and one or more thrust chambers 65 which each include at least one rocket nozzle, which are all arranged generally along a longitudinal axis 69 (which can be curved as shown schematically in FIG. 6 or substantially straight as shown in FIG. 4) of the engine module 70, and contained within a nacelle 66. While only the major elements of the engine module have been highlighted, it is understood that other elements of an engine such as for example those described above in relation to FIG. 2 may be present. The nacelle 66 can be attached to an aircraft wing 13, such as an aircraft wing 13 of an aircraft 1 as shown in FIGS. 1A, 1B and 1C. In the embodiment illustrated, the nacelle 66 is formed as a substantially curved tapered hollow body.

The air intake arrangement 62, the heat exchanger arrangement 63, the compressor 64, and the one or more thrust chambers 65 are arranged or located generally along the longitudinal axis 69 of the engine module 70 such that the heat exchanger arrangement 63 is physically located between the compressor 64 and the one or more thrust chambers 65. Advantageously, this provides for an engine module with a reduced overall length, as shall be described in more detail. The air intake arrangement 62, the compressor 64, the heat exchanger arrangement 63, and the one or more thrust chambers 65 may each have a respective axis, for example, a longitudinal axis. In the embodiment shown in FIG. 4, the respective axes of the air intake arrangement 62, the heat exchanger arrangement 63 and the compressor 64 are arranged generally coincident with the axis 69 of the engine module 70. Further in the embodiment shown in FIG. 4, the individual thrust chambers are symmetrically distributed or arranged around the axis 69 of the engine module 70, such that the axis of the one or more thrust chambers 65 is arranged generally coincident with the axis 69 of the engine module 70. Alternatively, it is envisaged that one or more of the respective axes of the air intake arrangement 62, the compressor 64, the heat exchanger arrangement 63 and the one or more thrust chambers 65 may be arranged parallel to or spaced apart from the axis 69 of the engine module 70, such that said one or more respective axes is/are not arranged generally coincident with the axis 69 of the engine module 70 when spaced along the axis 69 of the engine module 70. For example, the engine module 70 may comprise a second air intake arrangement, wherein the air intake arrangement 62 and the second air intake arrangement may be symmetrically distributed or arranged around the axis 69 of the engine module 70 such that the respective axes of the air intake arrangement 62 and the second air intake arrangement may be arranged parallel to or spaced apart from the axis 69 of the engine module 70. As another example, the heat exchanger arrangement 63 may be arranged such that an axis of the heat exchanger arrangement 63 may be arranged parallel to or spaced apart from the axis 69 of the engine module.

The longitudinal axis 69 of the engine module 70 has a first or proximate end 69a and a second or distal end 69b defining opposite ends of the engine module 70. The second end 69b of the axis 69 is located downstream of the first end 69a of the axis 69. The first end 69a of the axis is at a first end 71a of the engine module 70, and the second end 69b of the axis is at a second end 71b of the engine module 70. The air intake arrangement 62 is arranged at the first end 69a of the axis 69 or at the first end 71a of the engine module 70, and the one or more thrust chambers 65 are arranged at the second end 69b of the axis 69 or at the second end 71b of the engine module 70.

The air intake arrangement 62 comprises an air inlet 62a, through which air is configured to enter the air intake arrangement 62 and be captured by the engine module 70. The air intake arrangement 62 also includes an inlet cone 62b, which in the embodiment illustrated, is axisymmetric and has at least a portion 62f which is substantially conical in shape. In the embodiment shown, the inlet cone 62b has an apex 62e arranged at the first end 69a of the axis 69, e.g. at the first end 71a of the engine module 70. The apex 62e is the apex of a first substantially conical portion 62f of the inlet cone 62b, which tapers radially outwards in a direction away from the apex 62e. The inlet cone 62b includes a second portion 62g which tapers radially inwards in a direction away from the apex to form a truncated substantially conical shape. The first substantially conical portion 62f and the second portion 62g of the inlet cone 62b have a substantially curved transition section 62h therebetween.

The inlet cone 62b has an inner surface and an outer surface. The inner surface of the inlet cone 62b defines an inner volume 62c inside the inlet cone 62b. Between the outer surface of the inlet cone 62b and the inner surface of the nacelle 66, there is defined a tapered annular volume 62d, which is tapered due to the tapering of the outer surface of the inlet cone 62b relative to the inner surface of the nacelle 66. The tapered annular volume 62d, which is defined by the outer surface of the inlet cone 62b and the inner surface of the nacelle 66, serves to decelerate the airflow captured by the air inlet 62a to subsonic via oblique and normal shock waves. At high Mach numbers, e.g. around Mach 5 and above, this deceleration can cause the air inlet temperature typically to increase to over 1250K. It is the tapered annular volume 62d which provides a flow path for the captured airflow to be decelerated in this manner. The air inlet 62a is structurally defined by the tapered annular volume 62d. The air inlet 62a is the most upstream end of the tapered annular volume 62d (i.e. the end of the tapered annular volume 62d which is physically arranged proximate or adjacent to the first end 69a of the axis 69 or the first end 71a of the engine module 70).

The air inlet 62a is located adjacent to the first end 69a of the axis 69. As such, in the structural layout of the engine module 70, the compressor 64 is arranged between the air inlet 62a and the heat exchanger arrangement 63. Advantageously, this allows for the distance between the heat exchanger arrangement 63 and the one or more thrust chambers 65 to be reduced, when compared with the structural layout of the prior art engine module 15 of FIG. 3. This is because the heat exchanger arrangement 63 and the one or more thrust chambers 65 can be arranged much closer together, or even directly adjacent, along the longitudinal axis 69 of the engine module 70, because there is no need to provide additional space/longitudinal distance to fit the compressor between the heat exchanger arrangement and the one or more thrust chambers, as in the structural layout of the prior art engine module 15 of FIG. 3. As a result, the overall length of the engine module 70 can be significantly reduced, thus resulting in a more compact and lightweight engine module 70, and for the reduction of external aerodynamic forces. The engine module 70 can further include a fuel tank 74, which is arranged between the heat exchanger arrangement 63 and the thrust chambers (65).

In the example shown, the compressor 64 is arranged substantially fully inside the inlet cone 62b in the proximate end of the engine module, i.e. the compressor 64 is arranged within and occupies the volume 62c within the inlet cone 62b. Though, it is envisaged that the compressor 64 can be arranged only at least partially inside the inlet cone 62b, i.e. the compressor 64 can be arranged to only partially occupy the volume 62c within the inlet cone 62b. Advantageously, arranging the compressor 64 at least partially inside the inlet cone 62b utilises the otherwise empty volume 62c inside the inlet cone 62b, and allows for the distance between the heat exchanger arrangement 63 and the one or more thrust chambers 65 to be reduced, when compared with the structural layout of a prior art engine module, for example such as that of FIG. 3. As a result, the overall length of the engine module 70 can be significantly reduced, thus resulting in a more compact and lightweight engine module 70, and for the reduction of external aerodynamic forces.

The compressor 64 has an inlet end 64a into which air is received from the pre-cooler 63, and an outlet end 64b out of which compressed air is discharged from the compressor 64, wherein the air at the outlet end 64b is at a higher pressure than the air at the inlet end 64a. In the embodiment shown, the compressor 64 is orientated in a "reverse flow" orientation, which means that the inlet end 64a of the compressor 64 is arranged facing the pre-cooler 63, i.e. the inlet end 64a of the compressor 64 is located proximate the pre-cooler 63, and the outlet end 64b of the compressor 64 is arranged facing the air inlet 62a, i.e. the outlet end 64b of the compressor 64 is located proximate the air inlet 62a. Advantageously, this reduces the length of ducting required to connect the outlet of the pre-cooler 63 to the inlet end 64a of the compressor 64, compared with if the compressor 64 was mounted in the same location (i.e. with the pre-cooler 63 arranged between the compressor 64 and the one or more thrust chambers 65), but in the opposite orientation (i.e. with the inlet end 64a of the compressor being arranged facing the air inlet 62a, and the outlet end 64b of the compressor being arranged facing the pre-cooler 63).

The heat exchanger arrangement 63 is configured as a pre-cooler, which cools the inlet air from the air intake arrangement 62. The pre-cooler comprises two or more heat exchanger sections or stages. In the embodiment illustrated, the pre-cooler 63 has four heat exchanger sections 63a, 63b, 63c, and 63d, though any number of heat exchanger sections can be envisaged.

With reference to the arrows shown in FIG. 4, which illustrate the flow paths of the air between the air intake arrangement 62, the pre-cooler 63, and the compressor 64, the air flow paths which are provided for by the structural layout of the hybrid airbreathing rocket engine module 70 shall now be described in more detail. The air intake arrangement 62 serves to decelerate the captured airflow. This deceleration can cause the air temperature to increase as a portion of the air flows between the outer surface of the inlet cone 62b and the inner surface of the nacelle 66, as shown by the arrows 72.

There is provided a first air flow path 67 in the engine module 70 from the air intake arrangement 62 to the inlet of the pre-cooler 63. The first air flow path 67 has a first direction which is substantially longitudinal (i.e. substantially parallel to the axis 69 of the engine module 70) and in a direction which is away from the first end 69a of the axis and towards the second end 69b of the axis. The first air flow path then turns 90 degrees to have a second direction which is substantially radial and in a direction which is towards the axis 69 of the engine module 70 (i.e. radially inwards).

There is provided a second air flow path 68 in the engine module 70 from the outlet of the pre-cooler 63 to the inlet end 64a of the compressor 64. The second air flow path 68 has a first direction which is substantially radial and in a direction which is towards the axis 69 of the engine module 70 (i.e. radially inwards). The second air flow path 68 then turns 90 degrees to have a second direction which is substantially longitudinal (i.e. substantially parallel to the axis 69 of the engine module 70) and in a direction which is away from the second end 69b of the axis 69 and towards the first end 69a of the axis 69—i.e. the second air flow path 68 is configured to allow air to flow in a substantially longitudinal direction which is opposite to the flow of air in the first air flow path 67.

A third air flow path is provided from the outlet end 64b of the compressor 64 to the one or more thrust chambers 65. The third air flow path is in a direction which is substantially longitudinal (i.e. substantially parallel to the axis 69 of the engine module 70) and in a direction which is away from the first end 69a of the axis 69 and towards the second end 69b of the axis 69—i.e. the third air flow path is configured to allow air to flow in a substantially longitudinal direction which is opposite to the flow of air in the second air flow path 68.

A set of ducting 73 is provided from the outlet end 64b of the compressor 64 to one or more thrust chambers 65. The ducting 73 is configured to allow the third air flow path to flow through it.

Physically locating the heat exchanger arrangement 63 between the compressor 64 and the one or more thrust chambers 65 increases the longitudinal distance/separation between the compressor 64 and the one or more thrust chambers 65, compared with the compressor 31 and the one or more thrust chambers 17 of the prior art engine module 15. This means that the ducting 73 for the third air flow path is required to be longer in length than if the compressor 64 was physically located closer to the one or more thrust chambers 65, as in the prior art engine module 15. This increased length in the ducting 73 does result in an increased mass of the ducting 73. However, this increase in mass is offset by the advantageous significant reduction in mass of the overall engine module 70 that is provided by the reduced overall length of the engine module 70.

The ducting 73 can be formed using low temperature materials by insulating the inside surfaces of the ducting 73 and by physically locating the ducting 73 on the inner radial surface of the pre-cooler 63 and extending longitudinally therethrough to the one or more thrust chambers.

Figures 5A, 5B:
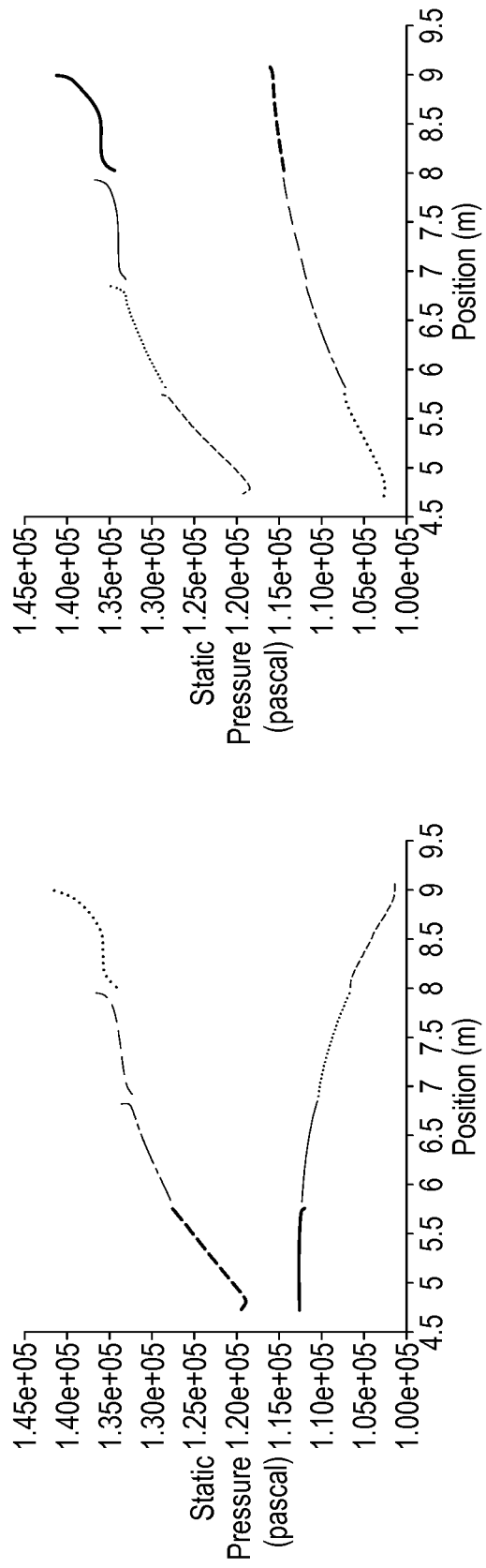
FIG. 5A illustrates the different in pressure profiles along the inner and outer radial surfaces of each heat exchanger section of the pre-cooler of the prior art hybrid airbreathing rocket engine module.
FIG. 5B illustrates the difference in pressure profiles along the inner and outer radial surfaces of each heat exchanger section of the pre-cooler of the hybrid airbreathing rocket engine module.

A further advantage of the hybrid airbreathing rocket engine module 70 is that as has been shown using computational fluid dynamics (CFD), the structural layout of the engine module 70 provides for a much more uniform (i.e. constant) pressure drop between the inner and outer radial surfaces of each of the heat exchanger sections 63a, 63b, 63c and 63d of the pre-cooler 63 across the length of the pre-cooler 63, compared with that of the prior art engine module 15. FIG. 5A illustrates the pressure profiles along the inner and outer radial surfaces of each of the sections of an example pre-cooler comprising four heat exchanger sections in the prior art hybrid airbreathing rocket engine module 15. FIG. 5B illustrates the pressure profiles along the inner and outer radial surfaces of each of the sections of a pre-cooler 63 comprising four heat exchanger sections in the hybrid airbreathing rocket engine module 70. In both FIGS. 5A and 5B, the x axis represents the position (i.e. distance) in metres along the pre-cooler 63, and the y axis represents the static pressure in Pascals. In both FIGS. 5A and 5B, pressure curves are plotted for both the inner and outer radial surfaces of each of the four heat exchanger sections of the pre-cooler.

The difference between the respective pressure profiles along the inner and outer radial surfaces of the heat exchanger sections in FIGS. 5A and 5B shows that the layout of the hybrid airbreathing rocket engine module 70 provides for a much more uniform pressure drop between the inner and outer radial surfaces of each of the heat exchanger sections across the length of pre-cooler 63 (i.e. across all of the heat exchanger sections), compared with the layout of the prior art hybrid airbreathing rocket engine module 15. In the layout of the prior art hybrid airbreathing rocket engine module 15, there is a significant mismatch in pressure drop across each heat exchanger section of the pre-cooler 21, as shown in FIG. 5A. For example, the maximum difference across the length of the pre-cooler (i.e. between the first and fourth heat exchanger sections) between the pressure drops across the inner and outer radial surfaces in each of the heat exchanger sections can be as much as approximately 30 kPa. This difference in pressure drop across each heat exchanger section is directly related to the mismatch in mass flow through each heat exchanger section in the layout of the prior art hybrid airbreathing rocket engine module 15. This mass flow mismatch can cause issues for cooling the flow adequately at high Mach numbers.

In contrast to the prior art hybrid airbreathing rocket engine module 15, in the hybrid airbreathing rocket engine module 70, the magnitude of the pressure drop (i.e. the difference in pressure between the inner and outer radial surface) across each heat exchanger section 63a, 63b, 63c and 63d is much more constant, i.e. similar. For example, as shown in FIG. 5B, the pressure drops between the inner and outer radial surfaces of the first and fourth heat exchanger sections of the hybrid airbreathing rocket engine module 70 can be approximately 17.5 kPa and 25 kPa respectively. This represents a maximum difference across the length of the pre-cooler (i.e. between the first and fourth heat exchanger sections) between the pressure drops across the inner and outer radial surfaces in each of the heat exchanger sections of as little as approximately 7.5 kPa, compared with approximately 30 kPa in the prior art hybrid airbreathing rocket engine module 15.

This correlates to a much more uniform mass flow distribution through each heat exchanger section. This in turn leads to an increase in total temperature uniformity at the compressor inlet end 64a, and may reduce or negate the need for a mechanical flow-balancing solution, for example flow control measures such as turning vanes, thus leading to a further reduction in the overall mass of the engine module 70.

As described herein, the hybrid airbreathing rocket engine module 70 advantageously allows for the overall length of the engine module 70 to be significantly reduced. This is achieved by arranging the heat exchanger arrangement 63 between the compressor 64 and the one or more thrust chambers 65. This allows for the compressor to be at least partially arranged inside the inlet cone 62b of the air intake arrangement 62. Compared with the prior art hybrid airbreathing rocket engine module 15, this layout reduces the distance between the heat exchanger arrangement 63 and the one or more thrust chambers 65, and utilises the otherwise empty volume 62c inside the inlet cone 62b of the air intake arrangement 62. The layout of the hybrid airbreathing rocket engine module 70 therefore makes efficient use of the space within the engine module 70, and in being shorter lengthwise, has a reduced overall volume and mass. Furthermore, as the engine module 70 is more compact, nacelle external aerodynamic forces are also reduced.

It should be understood that the disclosure also includes an aircraft, flying machine or aerospace vehicle comprising a hybrid airbreathing rocket engine module 70 as described herein.

Various modifications may be made to the described embodiment(s) without departing from the scope of the invention as defined by the accompanying claims.

The invention claimed is:

1. A structure for an engine module of a rocket engine, said structure comprising an inlet cone having an apex located at an upstream end of the inlet cone, the inlet cone defining a volume for receiving an engine component including a compressor for providing air to the rocket engine physically positioned and arranged such that an outlet of the compressor is positioned nearer the apex of the inlet cone than an inlet of the compressor and such that flow through the compressor from the inlet to the outlet is toward the upstream end of the inlet cone.

2. The structure as claimed in claim 1, wherein the engine module has a longitudinal axis having an upstream end and a downstream end, the apex of the inlet cone is located at the upstream end of the longitudinal axis, and the compressor is positioned and arranged for flow in the compressor along the longitudinal axis and toward the apex.

3. The structure as claimed in claim 1, wherein the engine module of the rocket engine is configured to be switchable from an air-breathing mode to a full rocket mode.

4. A hybrid airbreathing rocket engine module comprising:
an air intake configured to receive air;
a heat exchanger configured to cool air from said air intake;
a compressor configured to compress air from said heat exchanger; and
one or more thrust chambers;
wherein the air intake, the compressor, the heat exchanger, and the one or more thrust chambers are arranged generally along an axis of the hybrid airbreathing rocket engine module;
wherein the heat exchanger is physically positioned between the compressor and the one or more thrust chambers along the direction of the axis; and
wherein an inlet of the compressor is physically positioned between an outlet of said compressor and the heat exchanger along the direction of the axis.

5. The hybrid airbreathing rocket engine module as claimed in claim 4, wherein the air intake comprises an inlet cone configured to decelerate air received by the air intake, and wherein the compressor is at least partially arranged inside the inlet cone.

6. The hybrid airbreathing rocket engine module as claimed in claim 4, wherein the compressor has an inlet end and an outlet end, wherein the inlet end of the compressor is arranged facing the heat exchanger.

7. The hybrid airbreathing rocket engine module as claimed in claim 6, wherein there is provided a first air flow path from the air intake to the heat exchanger, and a second air flow path from the heat exchanger to the inlet end of the compressor, wherein the second air flow path is configured to allow air to flow in a substantially longitudinal direction which is opposite to the flow of air in the first air flow path.

8. A hybrid airbreathing rocket engine module comprising:
an air intake arrangement configured to receive air;
a heat exchanger arrangement configured to cool air from said air intake arrangement;
a compressor configured to compress air from said heat exchanger arrangement; and
one or more thrust chambers;
wherein the air intake arrangement, the compressor, the heat exchanger arrangement, and the one or more thrust chambers are arranged generally along an axis of the hybrid airbreathing rocket engine module;
wherein the air intake arrangement is located at an upstream end of the axis and the one or more thrust chambers are located at a downstream end of the axis;
wherein the heat exchanger arrangement is physically positioned between the compressor and the one or more thrust chambers;
wherein an inlet end of the compressor is physically positioned between an outlet end of the compressor and the heat exchanger; and
wherein the compressor is positioned and arranged for flow through the compressor from the inlet end to the outlet end to be along the axis and toward the upstream end of the axis.

9. The hybrid airbreathing rocket engine module as claimed in claim 8, wherein the air intake arrangement comprises an inlet cone configured to decelerate air received by the air intake arrangement, and wherein the compressor is at least partially arranged inside the inlet cone.

10. The hybrid airbreathing rocket engine module as claimed in claim 9, wherein the inlet cone includes an apex located at an upstream end of the inlet cone, wherein the inlet end of the compressor is located farther from the apex than the outlet end.

11. The hybrid airbreathing rocket engine module as claimed in claim 9, wherein the engine further comprises a nacelle, wherein the inlet cone, the heat exchanger arrangement, the compressor and the one or more thrust chambers are each at least partially arranged within the nacelle.

12. The hybrid airbreathing rocket engine module as claimed in claim 9, wherein the inlet cone is axisymmetric.

13. The hybrid airbreathing rocket engine module as claimed in claim 8, wherein there is provided a first air flow path from the air intake arrangement to the heat exchanger arrangement, and a second air flow path from the heat exchanger arrangement to the inlet end of the compressor, wherein the second air flow path is configured to allow air to flow in a substantially longitudinal direction which is opposite to the flow of air in the first air flow path.

14. The hybrid airbreathing rocket engine module as claimed in claim 13, wherein there is provided a third air flow path from the outlet end of the compressor to the one or more thrust chambers, wherein the third air flow path is configured to allow air to flow in a substantially longitudinal direction which is opposite to the flow of air in the second air flow path.

15. The hybrid airbreathing rocket engine module as claimed in claim 8, wherein the axis of the engine module is curved.

16. The hybrid airbreathing rocket engine module as claimed in claim 8, further comprising a fuel tank, wherein the fuel tank is arranged between the heat exchanger arrangement and the one or more thrust chambers.

17. The hybrid airbreathing rocket engine module as claimed in claim 8, wherein the one or more thrust chambers each comprises at least one rocket nozzle.

18. The hybrid airbreathing rocket engine module according to claim 8, in combination with a structure defining a volume for receiving the engine module.

19. The hybrid airbreathing rocket engine module as claimed in claim 8, wherein the hybrid airbreathing rocket engine module is configured to be switchable from an air-breathing mode to a full rocket mode.

20. The hybrid airbreathing rocket engine module according to claim 8, in combination with an aircraft, flying machine or aerospace vehicle.

* * * * *

UNITED STATES PATENT AND TRADEMARK OFFICE
CERTIFICATE OF CORRECTION

PATENT NO. : 11,661,908 B2  Page 1 of 1
APPLICATION NO. : 17/274730
DATED : May 30, 2023
INVENTOR(S) : Richard John Parker et al.

It is certified that error appears in the above-identified patent and that said Letters Patent is hereby corrected as shown below:

In the Specification

Column 3, Line 1, "FIGS. 1A, 1B and 10" should read - FIGS. 1A, 1B and 1C -

Column 3, Line 11, "FIG. 5A illustrates the different" should read - FIG. 5A illustrates the difference -

Column 3, Line 26, "FIGS. 1A, 1B and 10" should read - FIGS. 1A, 1B and 1C -

Column 3, Line 34, "As shown in FIGS. 10 and 2," should read - As shown in FIGS. 1C and 2 -

Column 7, Line 55, "1A, 1B and 10" should read - 1A, 1B and 1C -

Signed and Sealed this
Twenty-seventh Day of June, 2023

Katherine Kelly Vidal
*Director of the United States Patent and Trademark Office*